US011976424B2

(12) United States Patent
Markelz et al.

(10) Patent No.: US 11,976,424 B2
(45) Date of Patent: May 7, 2024

(54) RAILROAD MAINTENANCE SYSTEMS AND METHODS

(71) Applicant: Bridge and Track Crane LLC, Cary, IL (US)

(72) Inventors: Paul Markelz, Cary, IL (US); William Kenneth Quast, Aurora, IL (US)

(73) Assignee: Bridge and Track Crane LLC, Cary, IL (US)

(*) Notice: Subject to any disclaimer, the term of this patent is extended or adjusted under 35 U.S.C. 154(b) by 925 days.

(21) Appl. No.: 16/970,191

(22) PCT Filed: Feb. 18, 2019

(86) PCT No.: PCT/US2019/018440
§ 371 (c)(1),
(2) Date: Aug. 14, 2020

(87) PCT Pub. No.: WO2019/161344
PCT Pub. Date: Aug. 22, 2019

(65) Prior Publication Data

US 2021/0054576 A1 Feb. 25, 2021

Related U.S. Application Data

(60) Provisional application No. 62/710,354, filed on Feb. 16, 2018.

(51) Int. Cl.
*E01B 29/02* (2006.01)
*B61D 15/02* (2006.01)
(Continued)

(52) U.S. Cl.
CPC .............. *E01B 29/02* (2013.01); *B61D 15/02* (2013.01); *B66C 17/06* (2013.01); *B66C 23/50* (2013.01); *E01B 29/05* (2013.01); *E01B 2203/10* (2013.01)

(58) Field of Classification Search
CPC .......... E01B 29/00; E01B 29/02; E01B 29/05; E01B 2203/10; B61D 15/02; B66C 17/00;
(Continued)

(56) References Cited

U.S. PATENT DOCUMENTS 3,972,420 A * 8/1976 Stock ...................... B66C 17/06 294/906
4,275,659 A * 6/1981 Theurer .................. E01B 27/06 104/2

(Continued)

FOREIGN PATENT DOCUMENTS

WO 2018132832 A2 7/2018

OTHER PUBLICATIONS

Markelz, P. H. Rcrane on CN Merrillville, IN. Vimeo. Nov. 20, 2013. Retrieved from the internet URL: https://vimeo.com/79858359.

(Continued)

*Primary Examiner* — Zachary L Kuhfuss
*Assistant Examiner* — Cheng Lin
(74) *Attorney, Agent, or Firm* — Quarles & Brady, LLP

(57) ABSTRACT

Systems and methods for using a mobile crane assembly are provided. The mobile crane assembly includes a mobile crane having a first truss assembly and a second truss assembly spaced apart and movable relative to one another. The first truss assembly and the second truss assembly are each coupled to a rail car end assembly. The mobile crane further comprises an upper gantry assembly movable along the first truss assembly and the second truss assembly. A flat cart is coupled to the rail car end assembly, and a material handling cart is received upon the flat cart and is configured to move between the flat cart and the rail car end assembly based upon input from a controller in electrical communication with the upper gantry assembly.

20 Claims, 18 Drawing Sheets

(51) Int. Cl.
*B66C 17/06* (2006.01)
*B66C 23/50* (2006.01)
*E01B 29/05* (2006.01)

(58) Field of Classification Search
CPC ......... B66C 17/06; B66C 23/00; B66C 23/36; B66C 23/50
See application file for complete search history.

(56) References Cited

U.S. PATENT DOCUMENTS

| | | | | | |
|---|---|---|---|---|---|
| 4,979,247 | A | | 12/1990 | Buhler | |
| 5,511,268 | A | * | 4/1996 | Albus | E01D 21/06 212/312 |
| 5,657,888 | A | * | 8/1997 | Kroll | B66C 23/50 212/226 |
| 5,921,415 | A | * | 7/1999 | Markelz | B66C 17/00 212/312 |
| 5,947,308 | A | * | 9/1999 | Markelz | B66C 17/00 104/2 |
| 9,738,494 | B2 | * | 8/2017 | Shubel | B66C 19/002 |
| 2008/0163781 | A1 | * | 7/2008 | Green | E01B 29/17 104/5 |
| 2022/0089197 | A1 | * | 3/2022 | Markelz | B66C 17/06 |

OTHER PUBLICATIONS

Rcrane. ExoCore Concrete Homes. Jun. 30, 2014. Retrieved from the internet URL: https://r-crane.com/ExoCore%20June%202014%20Washington.pptx.

International Searching Authority. International Search Report and Written Opinion for application PCT/US2019/018440, dated Jun. 5, 2019.

* cited by examiner

RAILROAD MAINTENANCE SYSTEMS AND METHODS

CROSS-REFERENCES TO RELATED APPLICATIONS

The present application is a U.S. National Stage of PCT Application No. PCT/US2019/018440 filed on Feb. 18, 2019, which is based on, claims priority to, and incorporates herein by reference in its entirety U.S. Provisional Patent Application No. 62/710,354, filed on Feb. 16, 2018, and entitled "Railroad Maintenance Systems and Methods."

STATEMENT REGARDING FEDERALLY SPONSORED RESEARCH

Not Applicable.

BACKGROUND

Gantry cranes and/or level luffing cranes are often used, for example, in erecting and disassembling railroads and bridges. However, both gantry cranes and level luffing cranes are subject to numerous shortcomings. For example, gantry cranes are generally not suitable for on-site construction and require multiple railcars to transport the gantry cranes to the job site. In operation, level luffing cranes are subjected to lateral rotation after loading, which can induce unbalancing forces that can overcome the ballast provided by the carriage and machinery deck of the crane, and can lead to tipping.

Bridge and rail replacement can also be a time consuming and repetitive process. In most replacement operations, railroad panels (i.e., assembled sections of railroad track including ties and rail) are first assembled at an offsite location that can be hundreds of miles away from the track or bridge replacement site. The railroad panels are then shipped on tilt cars, which can hold one or more assembled panels in an angled orientation that allows the railroad panels to remain within the confines of the railway as they are transported. Once the panels arrive at the jobsite, they can be picked off of the tilt carts and set off to the side of the rail to be replaced. To replace the rails, the panels are picked up individually and placed into their desired location, which can be a slow process lasting several weeks or even months, depending on the size of the replacement.

Transporting railroad panels over hundreds of miles can also subject the fasteners in the panels to cyclical vibrational stresses and impacts that can decrease the life of the panels. The wear caused by shipping the panels over rail increases the frequency that the maintenance and replacement processes are needed, which introduces additional and potentially substantial costs into railway upkeep.

SUMMARY OF THE INVENTION

The disclosure provides mobile crane assemblies and methods of using mobile crane assemblies to perform rail maintenance and replacement procedures. In particular, systems and methods are provided for a mobile crane that is designed to enable easy transportation on a railcar to and from a job site. The mobile crane system can be used to perform a complete railroad panel replacement process, and enables mobile railroad panel building, disassembly, and recycling that can significantly reduce cost, waste production, and time spent at a jobsite. The mobile crane systems can include additional carts that can quickly and efficiently transport railroad panels toward and away from the truss assemblies of the mobile crane assembly. The mobile crane is designed to manipulate objects (e.g., railroad track assemblies, bridge assemblies, etc.) with increased weight and length, which enables the delivery and installation of new objects in limited time and space. Moreover, the mobile crane can be modular and can be configured to include various lifting and object manipulating features, as required by a specific application.

In some aspects, the disclosure provides a mobile crane assembly. The mobile crane apparatus has a longitudinal axis and a first truss assembly and a second truss assembly spaced apart from one another and extending approximately parallel to the longitudinal axis. The first truss assembly and second truss assembly are movable transverse to the longitudinal axis to translate between a transport configuration and a work configuration. An upper gantry assembly spans between the first truss assembly and the second truss assembly, and is slidably movable parallel to the longitudinal axis of the mobile crane apparatus. A mule cart pathway extends away from the mobile crane and is partially defined by at least one flat cart coupled to a rail car end assembly. The rail car end assembly is slidably coupled to the mobile crane and is configured to move the first truss assembly and the second truss assembly transverse to the longitudinal axis.

In some aspects, a method of performing railroad maintenance is disclosed. The method includes transporting railroad ties and rails to a railroad replacement site using a mobile crane assembly. The mobile crane assembly includes a mobile crane with a longitudinal axis and a first truss assembly and a second truss assembly spaced apart from one another and extending approximately parallel to the longitudinal axis. The first truss assembly and the second truss assembly are movable transversely to the longitudinal axis to translate between a transport configuration and a work configuration. The mobile crane assembly has at least one upper gantry assembly spanning the first truss assembly and the second truss assembly. The upper gantry assembly is slidably movable parallel to the longitudinal axis. The mobile crane assembly further comprises a material handling cart pathway extending away from the mobile crane that is partially defined by at least one flat cart coupled to a rail car end assembly. The method further comprises assembling a replacement railroad panel between the first truss assembly and the second truss assembly using the upper gantry assembly and railroad ties and rails transported to the railroad replacement site. Then, the replacement railroad panel is installed within the railroad replacement site by exchanging an installed railroad panel with the replacement railroad panel.

A mobile crane assembly is also disclosed. The mobile crane assembly comprises a mobile crane having a first truss assembly and a second truss assembly spaced apart and movable relative to one another. The first truss assembly and the second truss assembly are each coupled to a rail car end assembly. The mobile crane further includes an upper gantry assembly movable along the first truss assembly and the second truss assembly. A flat cart is coupled to the rail car end assembly, and a material handling cart is received upon the flat cart. The material handling cart is configured to move between the flat cart and the rail car end assembly based upon input from a controller in electrical communication with the upper gantry assembly.

A method of building a railroad panel is also disclosed. The method includes transporting a plurality of railroad ties and a plurality of rails over an existing railroad using a mobile crane assembly. The method also includes assembling a railroad panel on top of the existing railroad by setting the plurality of railroad ties onto the existing railroad and then coupling at least two of the plurality of rails to the railroad ties. The plurality of railroad ties are set onto the existing railroad using an upper gantry assembly of the mobile crane assembly.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DESCRIPTION OF DRAWINGS

The invention will be better understood and features, aspects, and advantages other than those set forth above will become apparent when consideration is given to the following detailed description thereof. Such detailed description makes reference to the following drawings.

Figure 1:
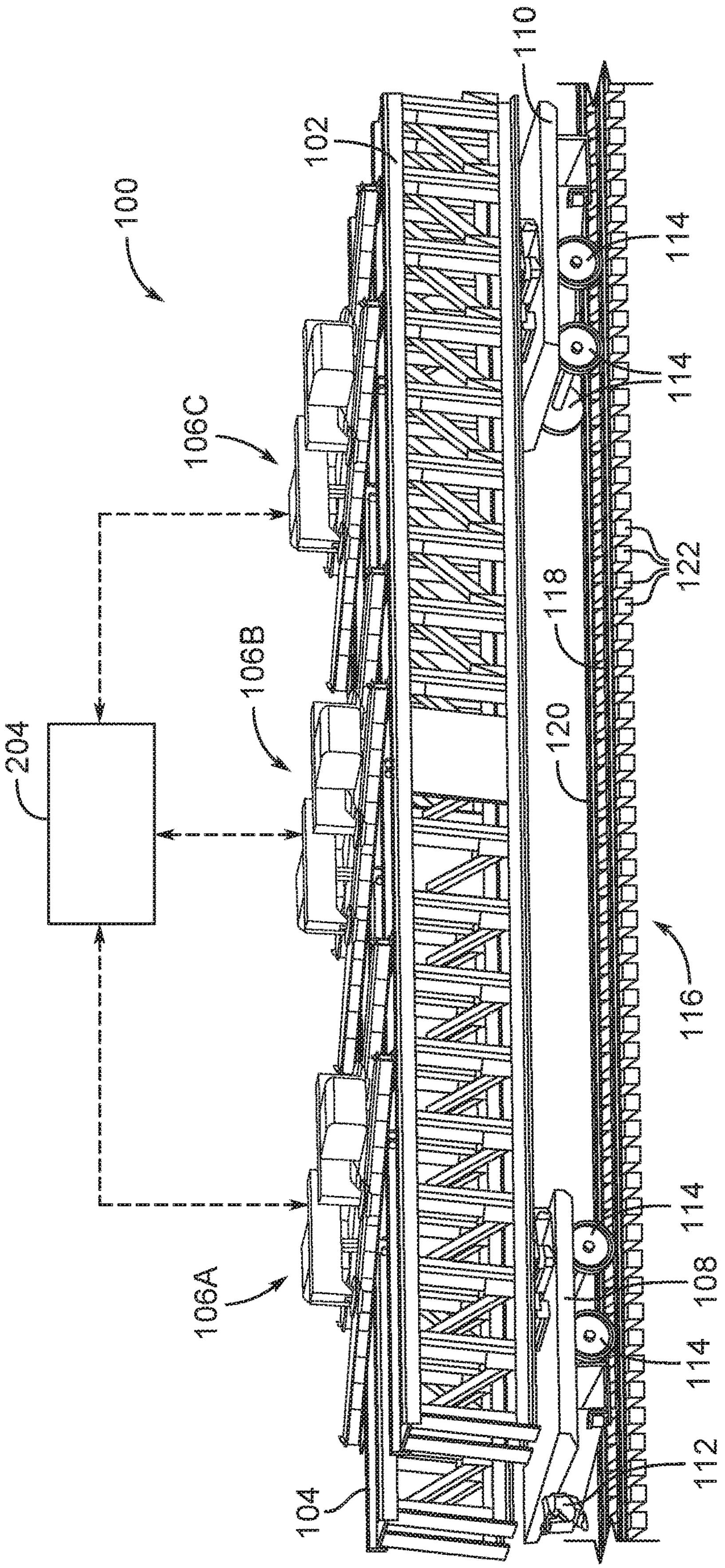
FIG. 1 is a top perspective view of a mobile crane in a transport configuration according to an aspect of the present disclosure.

Corresponding reference characters indicate corresponding parts throughout the several views. Although the drawings represent embodiments of the disclosure, the drawings are not necessarily to scale and certain features may be exaggerated in order to better illustrate and explain embodiments of the disclosure.

DETAILED DESCRIPTION OF THE INVENTION

The invention will now be described more specifically with reference to the following non-limiting examples. It is to be noted that the following embodiments are presented herein for purpose of illustration and description only. It is not intended to be exhaustive or to be limited to the precise form disclosed.

It is to be understood that the phraseology and terminology used herein is for the purpose of description and should not be regarded as limiting. The use of "including," "comprising," or "having" and variations thereof herein is meant to encompass the items listed thereafter and equivalents thereof, as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

FIG. 1 illustrates one non-limiting example of a mobile crane 100 according to aspects of the disclosure. The mobile crane 100 includes a first truss assembly 102 and a second truss assembly 104 each slidably coupled to first and second rail car end assemblies 108, 110 at opposing ends thereof. The first truss assembly and second truss assembly can support one or more upper gantry assemblies 106A, 106B, 106C. In some aspects, the upper gantry assemblies 106A, 106B, 106C can translate along the first and second truss assemblies 102, 104 parallel to a longitudinal axis X-X (shown in FIG. 3) of the mobile crane 100. The first truss assembly 102 and the second truss assembly 104 can be spaced apart from one another by a variable distance, depending on the desired operation of the mobile crane 100. For example, the mobile crane 100 can be in a transport configuration where the mobile crane 100 can be transported on a railroad track 116 to and from a job site (e.g., a railroad replacement location), as shown in FIG. 1. In the transport configuration, the design and properties of the mobile crane 100 with the rail car end assemblies 108, 110 enable the mobile crane 100 to be transported and act as a single railcar. The rail car end assemblies 108, 110 can also be spaced apart from one another by a variable distance, as the slidable couplings to the first truss assembly 102 and the second truss assembly 104 allow the rail car end assemblies 108, 110 to move toward or away from one another along the longitudinal axis X-X. Transporting the mobile crane 100 as a single railcar provides more available space for new materials to be delivered to the job site, which can reduce transportation costs.

Figure 2:
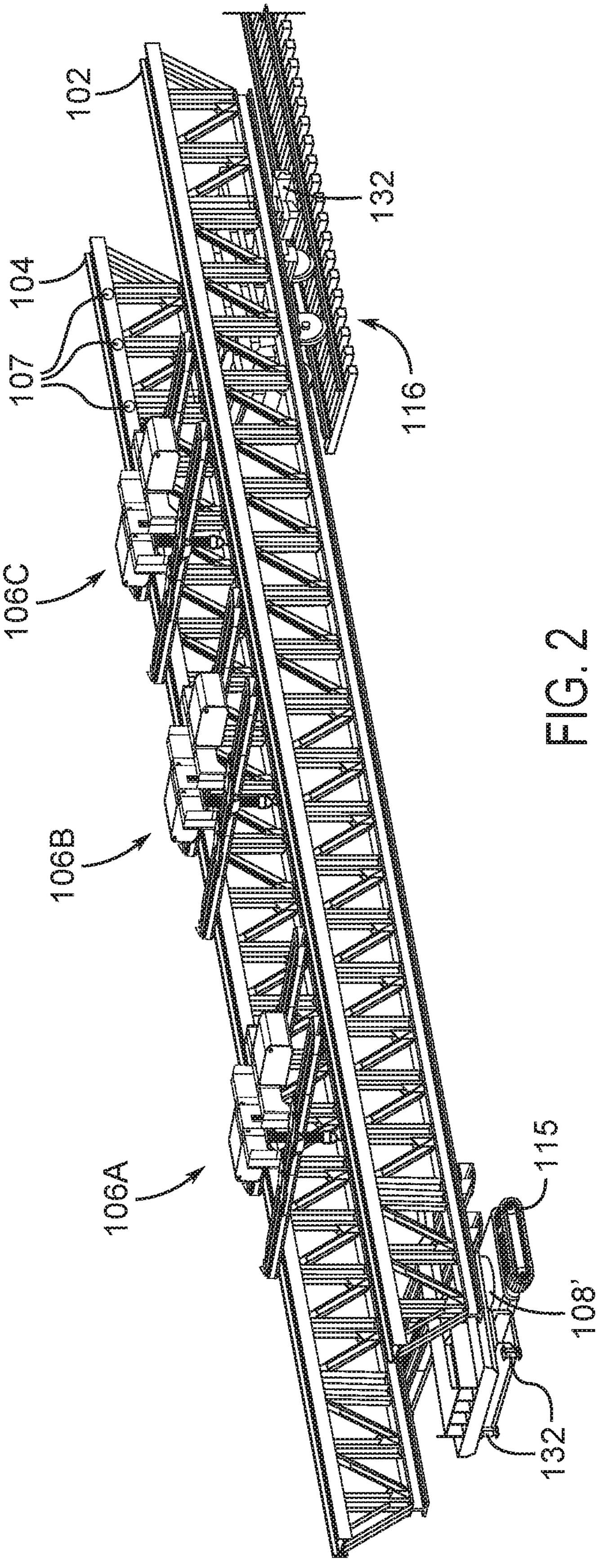
FIG. 2 is a top perspective view of the mobile crane of FIG. 1 in a work configuration.
Figure 3:
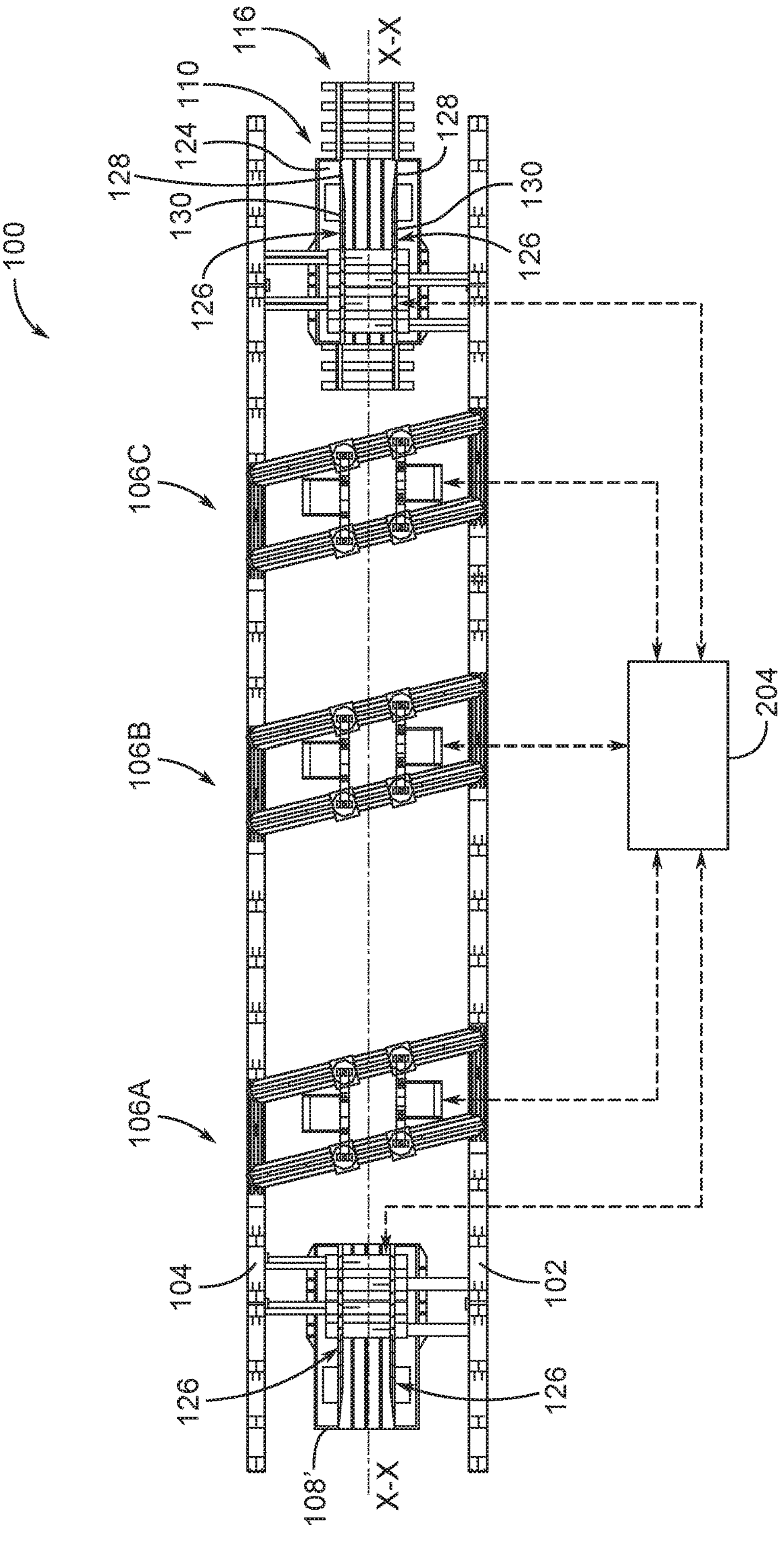
FIG. 3 is a top view of the mobile crane of FIG. 2.

The mobile crane 100 is moveable between a transport configuration (shown in FIG. 1) and a work configuration (shown in FIGS. 2 and 3). The first and second truss assemblies 102, 104 are coupled to the first and second rail car end assemblies 108, 110, which can selectively translate the truss assemblies 102, 104 transversely to the longitudinal axis X-X of the mobile crane 100. For example, the truss assemblies 102, 104 can translate inwardly toward one another to transition the mobile crane 100 from the work configuration to the transport configuration or outwardly away from one another to transition the mobile crane 100 from the transport configuration to the work configuration. In some aspects, the coupling between the first and second rail car end assemblies 108, 110 and the first and second truss assemblies 102, 104 can allow the truss assemblies 102, 104 to move relative to the rail car end assemblies 108, 110, which may remain stationary while the mobile crane 100 transitions between work and transport configurations. The first and second truss assemblies 102, 104, the rail car end assemblies 108, 110, the upper gantry assemblies 106A, 106B, 106C, and additional components coupled to these items can be similar to those shown and described in International Patent Application No. PCT/US18/13880, entitled "Mobile Crane Systems and Methods" which is hereby incorporated by reference in its entirety. In some aspects, a plurality of illumination sources 107 can be spaced about the first and second truss assemblies 102, 104 to provide light for nighttime working.

The upper gantry assemblies 106A, 106B, 106C may be in electrical communication with a controller 204 that is configured to control operation (e.g., translation along the first and second truss assemblies 102, 104 and/or raising and lowering of a gantry attached a respective one of the upper gantry assemblies 106A, 106B, 106C.

In some aspects, the rail car end assemblies 108, 110 include a plurality of wheels 114 to transport the mobile crane 100 along the rails 118, 120 of a railroad track 116. In the work configuration, the wheels 114 of one or both of the rail car end assemblies 108, 110 can be exchanged for a rail car end assembly 108' having continuous tracks 115 (see FIGS. 2 and 3). The continuous tracks 115 can be used to support and secure the mobile crane 100 upon the ground near the railroad tracks 116, rather than to the rails 118, 120 of the railroad track 116. In some aspects, the continuous tracks 115 are spaced apart from one another wider than the rails 118, 120 are spaced apart from one another, so that the continuous tracks 115 can straddle the rails 118, 120 (or the entire railroad 116, in some examples) when the mobile crane 100 is in a work configuration.

The rail car end assemblies 108, 110 can each include an upper surface 124 extending above the wheels 114 or tracks 115. One or more guide rails 126 can extend upon the upper surface 124 to define a pathway for a mule cart 144 or other type of material handling cart, as discussed in detail with reference to FIGS. 7A-8 below. In some examples, the guide rails 126 provide a tapered section 128 that bows outward from an approximately straight section 130. The gradual taper provided by the tapered section 128 can help receive and center a mule cart 144 or other item as it passes toward or from a flat cart 134, as shown in FIG. 4.

Additionally, the rail car end assemblies 108, 110 can include one or more jacks 132 (see FIG. 2). The jacks 132 can be configured to extend toward the ground and can suspend the rail car end assemblies (and mobile crane 100) above the rails 118, 120 of the railroad track 116. The jacks 132 can provide additional stability and can prevent rolling motion of the mobile crane 100 between the wheels 114 and the railroad track 116. In some embodiments, each rail car end assembly 108, 110 includes jacks 132 positioned in each corner of the rail car end assembly 108, 110 to evenly distribute the loading of the mobile crane 100 about each rail car end assembly 108, 110. Each jack 132 may be configured to support about 50 tons, for example. The jacks 132 may be configured to engage the rails 118, 120, railroad ties 122, or the ground below the railroad track 116.

Figure 4:
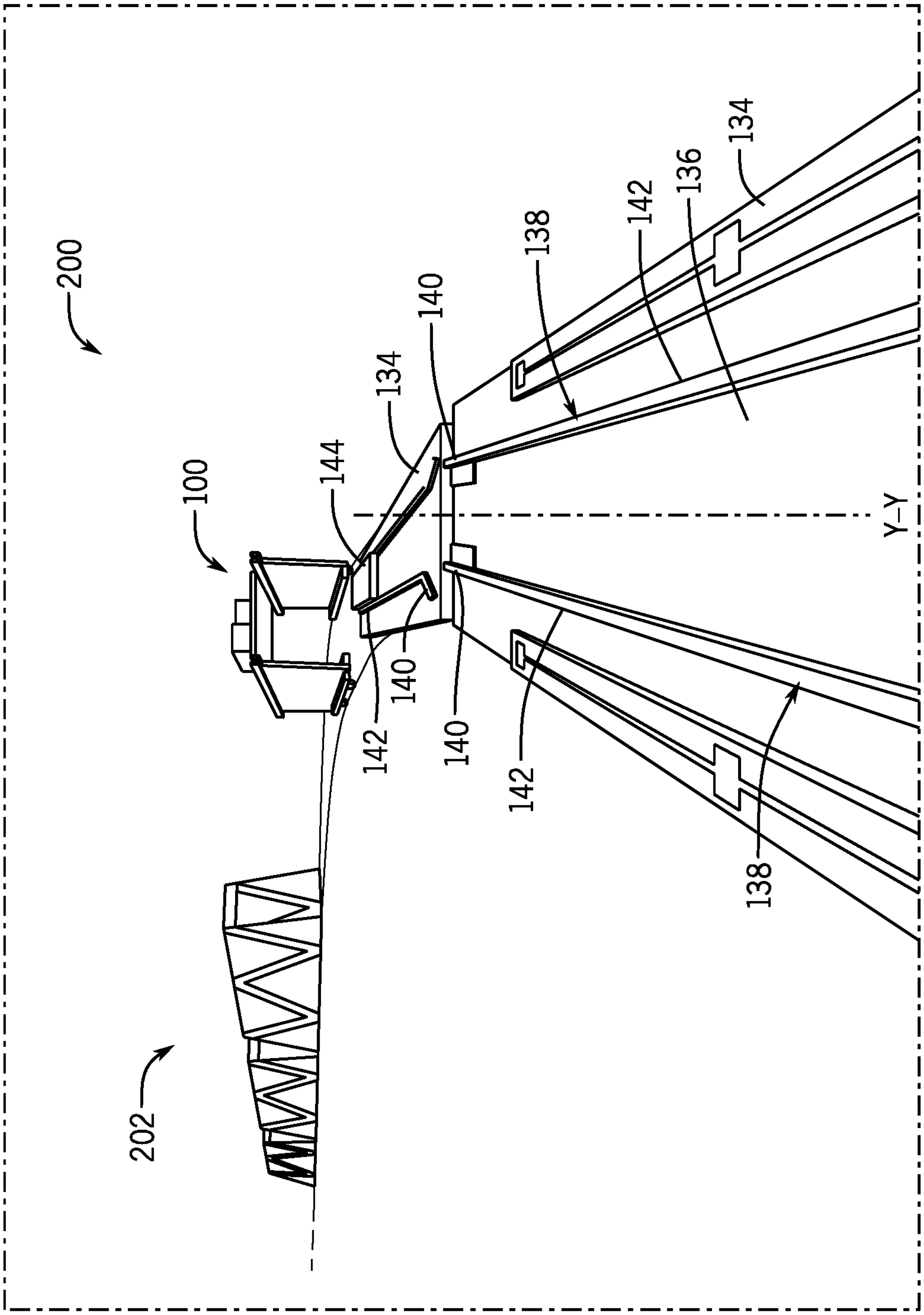
FIG. 4 is a pictorial view of a mobile crane assembly including the mobile crane of FIG. 1.

Referring now to FIG. 4, a mobile crane assembly 200 is shown traveling toward a bridge replacement site 202. The mobile crane assembly 200 includes the mobile crane 100 and one or more flat carts 134 coupled to one another and extending along the railroad track 116. In some embodiments, the one or more flat carts 134 are coupled to the rail car end assemblies 108, 110 using a coupling 112 (see FIGS. 5A and 5B). In some embodiments, flat carts 134 are positioned both in front of and behind the mobile crane 100 in the mobile crane assembly 200, and are coupled to both of the first rail car end assembly 108 and the second rail car end assembly 110.

Similar to the rail car end assemblies 108, 110, the flat carts 134 can include an upper surface 136 and guide rails 138 that are configured to provide a guide path for mule carts 144 or other material handling carts used to transport goods between flat carts 134 and the mobile crane 100. The guide rails 138 can extend the length of the flat cart 134, and can include tapered sections 140 and straight sections 142. A tapered section 140 can be positioned on each side of the flat cart 134, and can act as a funnel to guide and center a mule cart or other cart as it transitions between flat carts 134. The tapered section 140 can extend away from each end of the flat cart 134 to the straight section 142, which extends approximately parallel to a longitudinal axis Y-Y of the flat cart 134 toward the opposing tapered section 140. In some embodiments, the straight sections 142 of each guide rail 138 are spaced apart to receive and guide the motion of a mule cart 144 or other material handling cart therein.

Figure 5A:
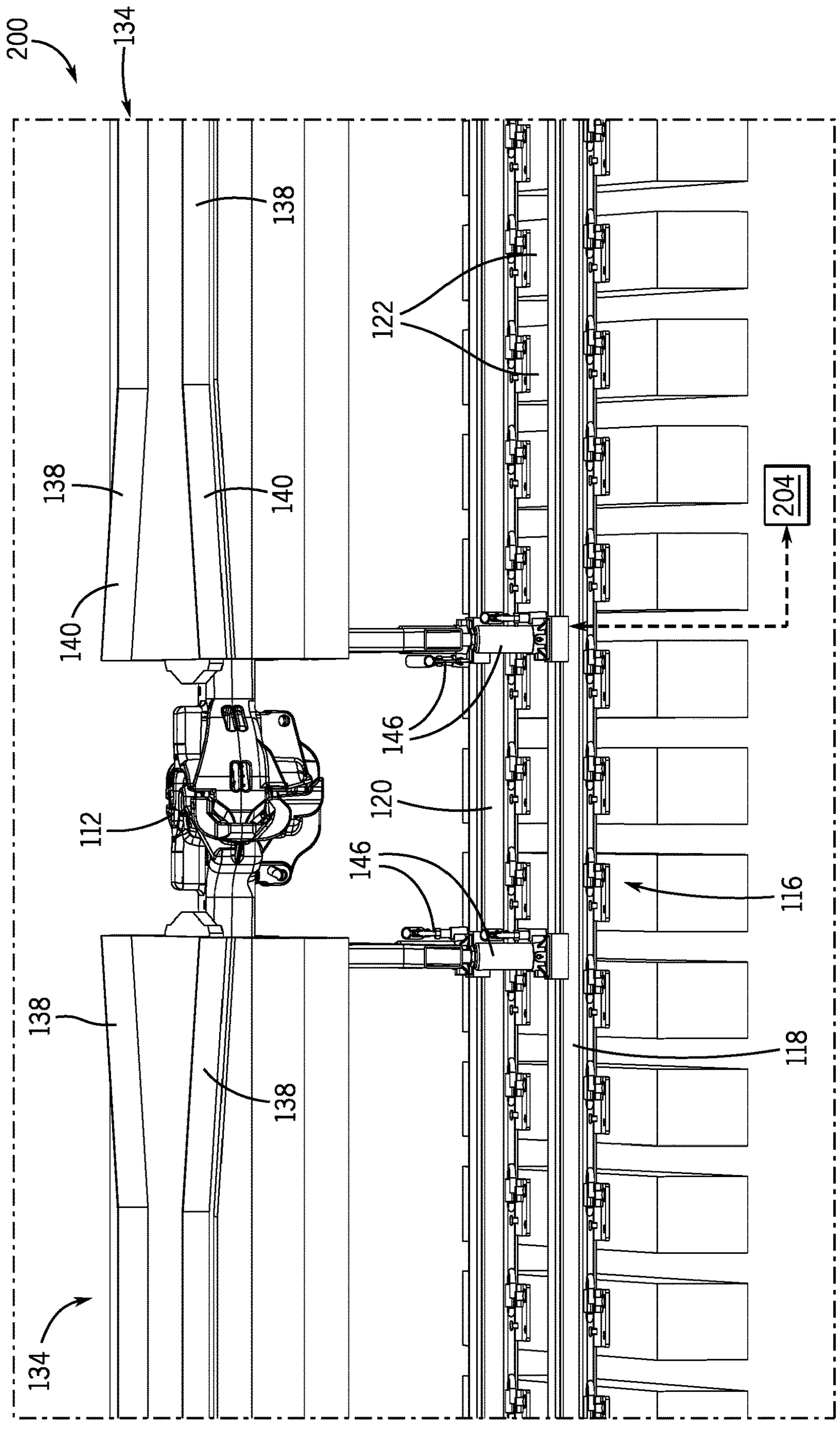
FIG. 5A is a pictorial view of a coupling mechanism between flat carts that are present in the mobile crane assembly of FIG. 4.
Figure 5B:
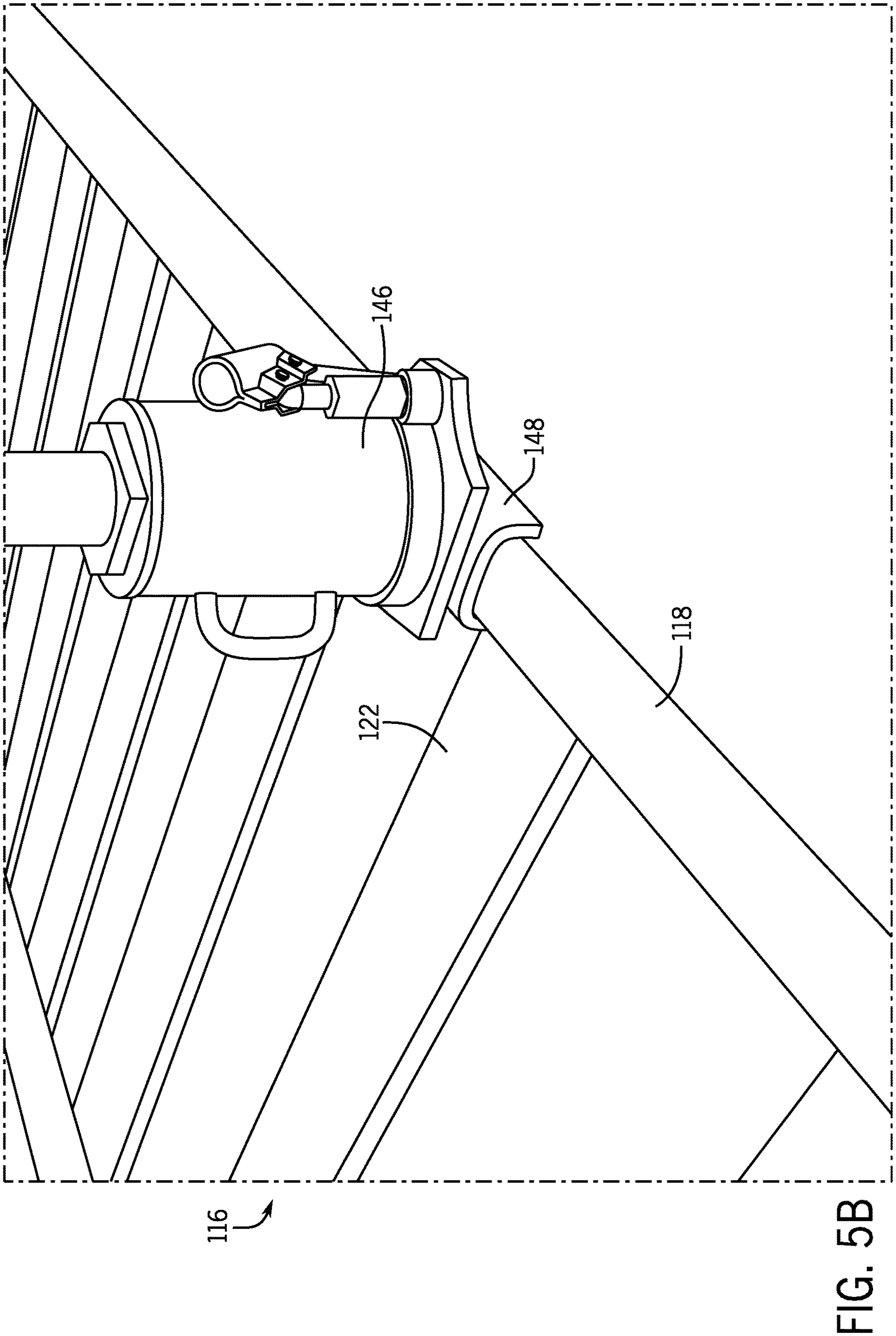
FIG. 5B is a pictorial view of a jack that can be coupled to one of the flat carts of FIG. 5A.

As shown in FIGS. 5A and 5B, the rail car end assemblies 108, 110 can include couplings 112 that can be used to functionally connect additional carts to the mobile crane 100. The flat carts 134 can also include one or more jacks 146 that are configured to lift the flat cart 134 off the rails 118, 120 of the railroad 116. In some non-limiting examples, jacks 146 are coupled to each corner of a flat cart 134 to evenly distribute and suspend the load carried by the flat cart 134 from the wheels (not shown) of the flat cart 134. The jacks 146 can include a brace 148 that has a U-shaped profile and can be received around one of the rails 118, 120 of the railroad 116 to balance and support the flat cart 134 on the rails 118, 120. In some aspects, the jacks 146 are hydraulic in nature, and can be activated manually or automatically. The jacks 146 can be remote controlled, and can be placed in electrical communication with a controller 204 that may be present within the mobile crane 100 to control motors coupled to the upper gantry assemblies 106A, 106B, 106C or the lower gantry assemblies (not shown), for example. In some aspects, the jacks 146 activate and engage the rails 118, 120 when the controller 204 receives a command to transition the mobile crane 100 from the transport configuration to the work configuration. Similarly, the jacks 146 can be configured to lower the flat cart 134 back onto the rails 118, 120 when the controller 204 receives a command to return the mobile crane 100 to a transport configuration.

Figure 6:
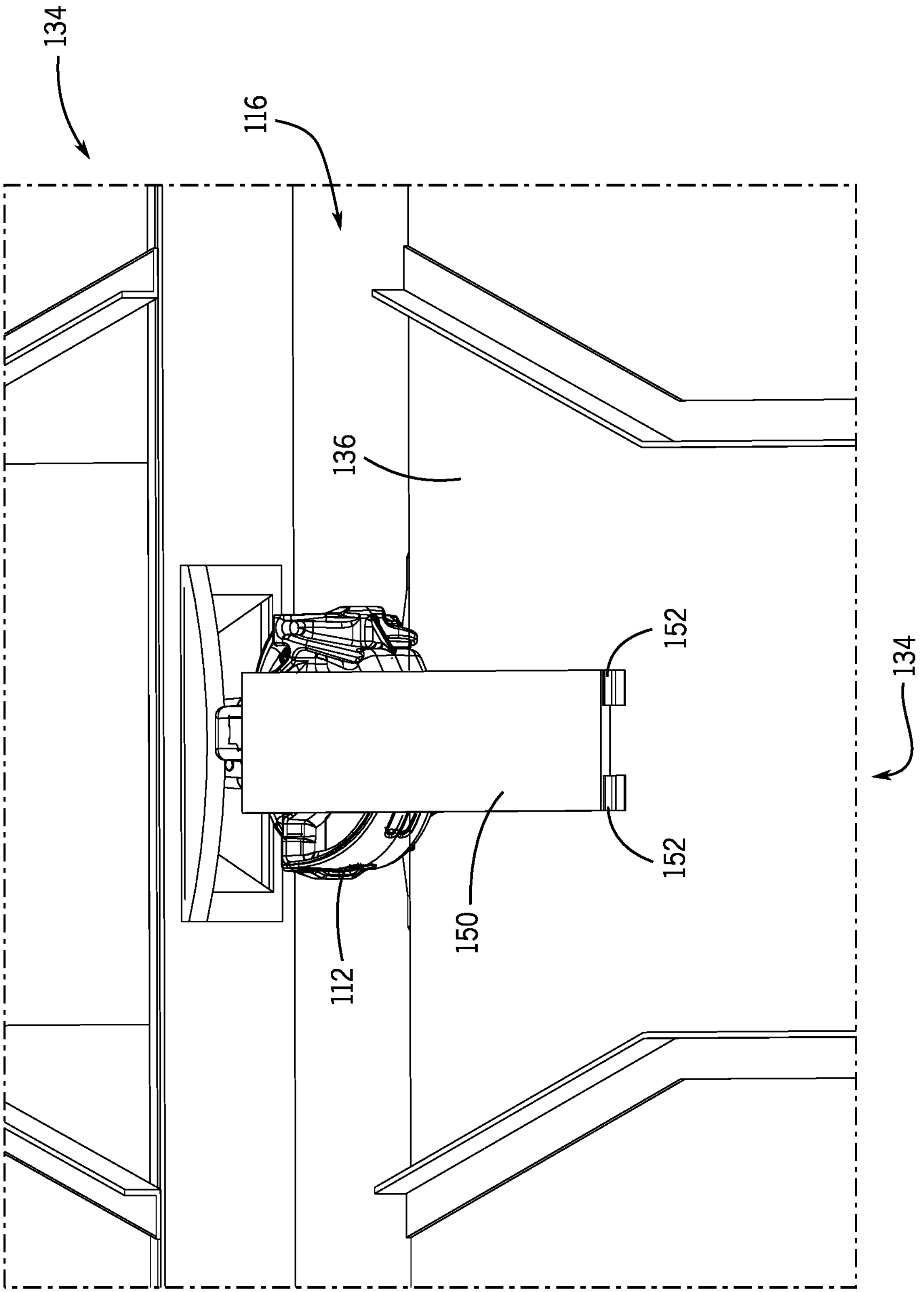
FIG. 6 is a pictorial view of an extension member that can be coupled to the flat carts of FIG. 5A.

In some aspects, as illustrated in FIG. 6, an extension member 150 can be coupled to the upper surface 136 of the flat carts 134. The extension member 150 can be formed of plate or bar steel or other rigid material, and can be used to provide additional support for a mule cart 144 or other material handling cart as it passes from one flat cart 134 to another adjacent flat cart 134 (or to a rail car end assembly 108, 110). The extension member 150 can extend toward and over the coupling 112, and can be used to support the center of the mule cart 144. In some aspects, the extension member 150 is hingedly coupled to the upper surface 136 of the flat cart 134, and can be rotated about hinges 152 between a stowed position (not shown) and a deployed position (shown in FIG. 6). In the stowed position, the extension member 150 can be positioned above the upper surface 136 of the flat cart 134. In the deployed position, the extension member 150 extends outward beyond and approximately parallel to the upper surface 136 of the flat cart 134. In some non-limiting examples, the extension member 150 is positioned along the longitudinal axis Y-Y of the flat cart 134. Alternatively, several extension members 150 can be positioned parallel to the longitudinal axis Y-Y of the flat cart 134, and can extend toward a nearby flat cart 134 or rail car end assembly 108, 110.

Figure 7A:
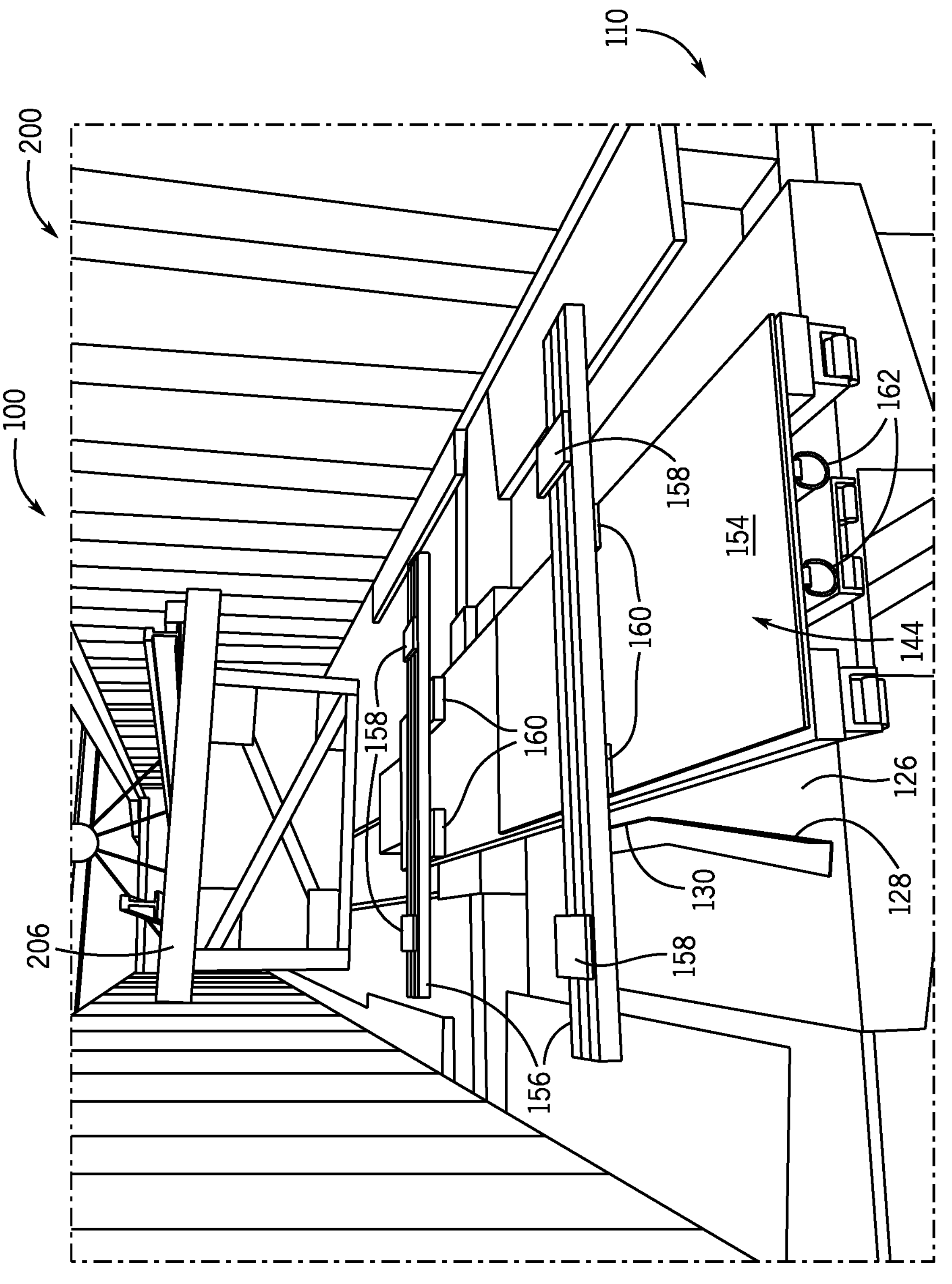
FIG. 7A is a top pictorial view of a mule cart that can be received upon the flat carts of FIG. 5A.
Figure 7B:
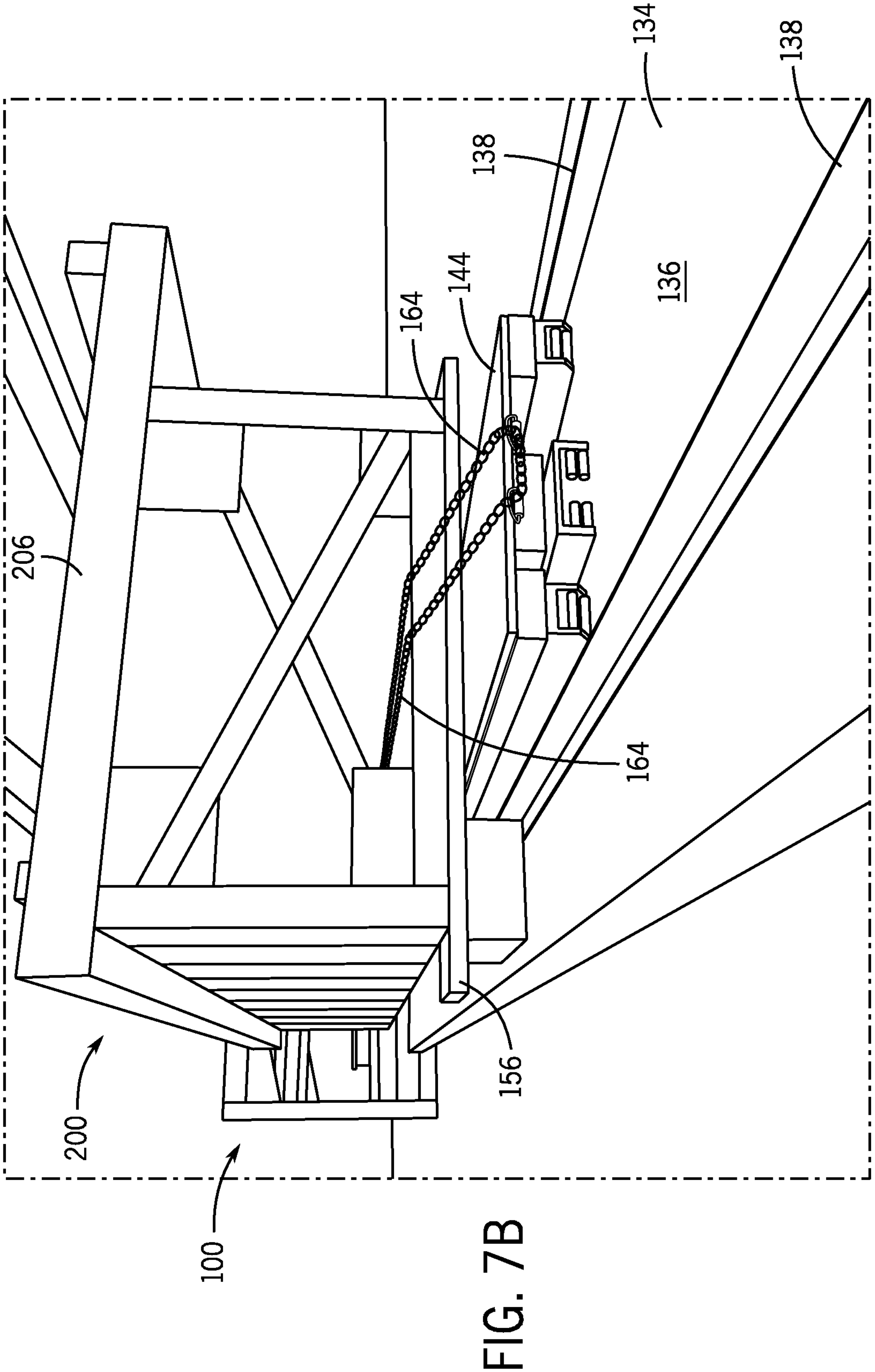
FIG. 7B is a pictorial view of the mule cart of FIG. 7A received upon the flat cart of FIG. 5A and transporting a bridge panel away from a bridge replacement site.
Figure 8:
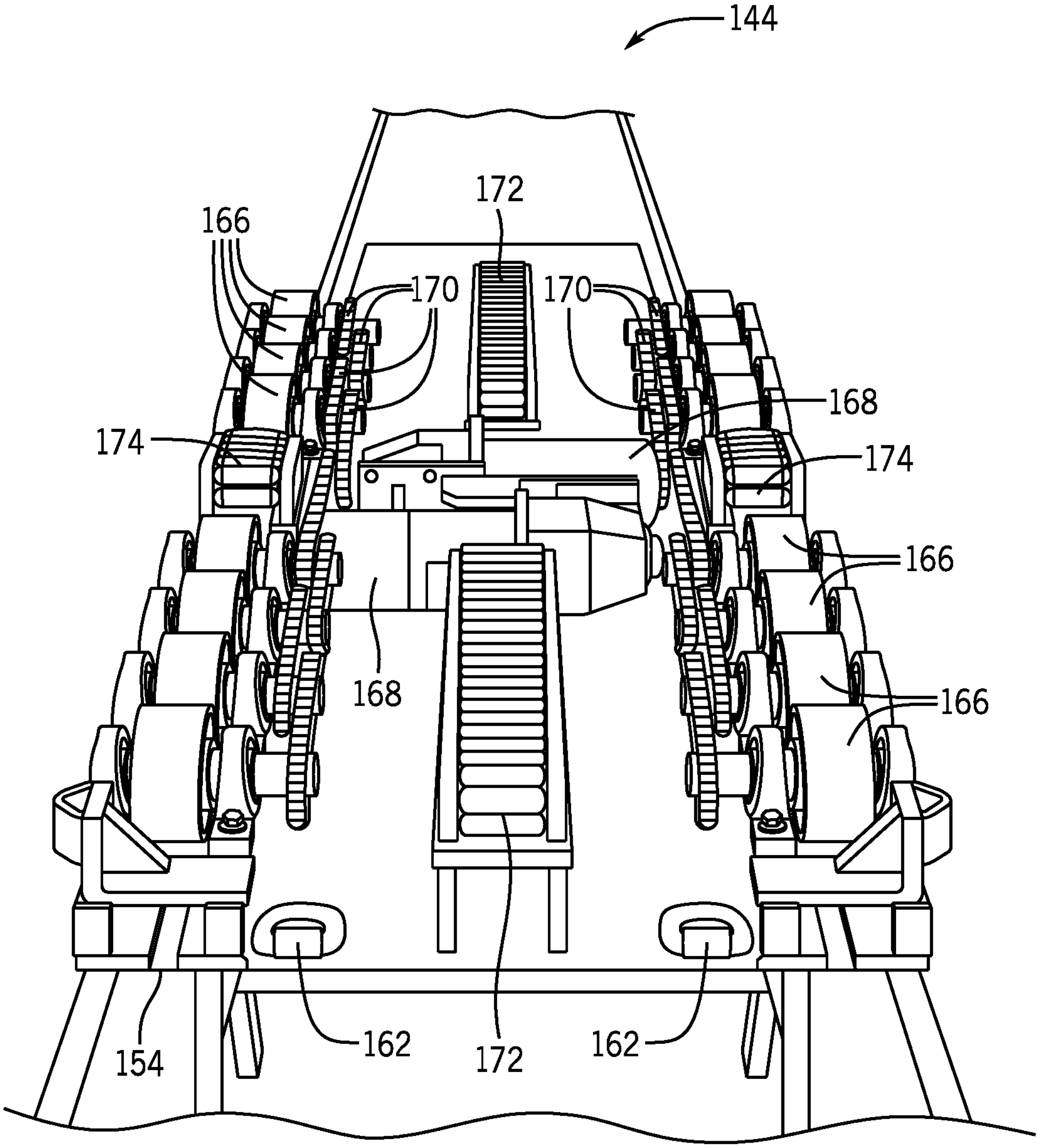
FIG. 8 is a pictorial view of an underside of a mule cart that can be received upon the flat carts of FIG. 5A.

Referring now to FIGS. 7A, 7B, and 8, a mule cart 144 used in the mobile crane assembly 200 is shown received within the guide rails 126 of the rail car end assembly 110. The mule carts 144 can be self-propelled and can carry mega panels 206 over flat carts 134 toward and away from a bridge or rail replacement site, such as the bridge replacement site 202 shown in FIG. 4. In some aspects, the mule cart 144 includes a support surface 154 that is configured to receive and support various items that are advantageously transported to and from the mobile crane 100. In some non-limiting examples, the support surface 154 is formed of plate metal and provides a rigid and flat structure capable of balancing and supporting heavy items.

In some aspects, support bars 156 are received upon the support surface 154 of the mule carts 144. The support bars 156 can extend across the support surface 154 of the mule cart 144 to provide additional balance for wider loads, like the mega panels 206 shown in FIG. 7B. The support bars 156 can be formed of tube steel, for example, and can be welded to the support surface 154 of the mule carts 144. The support bars 156 can include shock pads 158 formed of a resilient material that is configured to receive and support items received upon the support bars 156. In other aspects, the support bars 156 can be removably received upon risers 160 placed on the support surface 154. The risers 160 can be wooden blocks, for example, and can be fastened to or otherwise coupled (e.g., using adhesive or weldments) to the support surface 154.

In some examples, one or more shackles 162 are coupled to the mule carts 144. The shackles 162 can provide lifting and grappling leverage points, and can be used to transport a mule cart 144 or secure an item (e.g., mega panel 206) to the mule cart 144. In some aspects, multiple mule carts 144 can be used to transport a single panel 206 toward or away from the mobile crane 100. Chains 164 can be passed through or coupled to the shackles 162 to secure the mega panel 206 or other item(s) to the mule cart 144 to restrict unwanted movement relative to the mule cart 144 as it moves along the upper surface 136 of a flat cart 134 or the upper surface 124 of the rail car end assemblies 108, 110.

With specific reference to FIG. 8, the underside of a mule cart 144 is shown in detail. The mule carts 144 can include rollers 166 used to transport the mule cart 144 toward and away from the mobile crane 100 along the flat carts 134 and rail car end assemblies 108, 110. The rollers 166 can be positioned on both sides of the mule cart 144, and can be coupled to a motor 168 using a belt or chain drive 170. In some aspects, each roller 166 is coupled to each adjacent roller 166 using a separate chain drive 170. In this way, the motor torque applied by the motor 168 to a single roller 166 or chain drive 170 is transferred to all rollers 166 on a side of the mule cart 144. This allows the mule cart 144 to continue translating forward, even when some of the rollers 166 may not be in contact with a rail car end assembly or a flat cart 134 (e.g., when the mule cart 144 is moving from one flat cart 134 to the next). The motor(s) 168 can be in electrical communication with the controller 204, and can be remotely controlled to drive items throughout the mobile crane assembly 200. For example, the controller 204 may instruct the motor 168 to effect movement of the mule cart 144 between the flat cart 134 and one or the rail car end assemblies 108, 110.

The mule carts 144 can also include one or more roller bearing chains 172. The roller bearing chains 172 can be positioned to contact the upper surfaces 124, 136 of the rail car end assemblies 108, 110 and the flat carts 134. The roller bearing chains 172 provide a low friction rolling contact between the mule carts 144 and the flat carts 134 and rail car end assemblies 108, 110, and can allow improved movement of the mule carts 144 about the mobile crane assembly 200. In some aspects, roller bearing chains 172 are positioned along the centerline of the mule carts 144. The roller bearing chains 172 can then travel about the extension member 150 as it passes between flat carts 134. In some non-limiting examples, side roller bearing chains 174 are positioned approximately in line with the rollers 166, and can further support and move the mule cart 144 about the mobile crane assembly 200.

Figure 9:
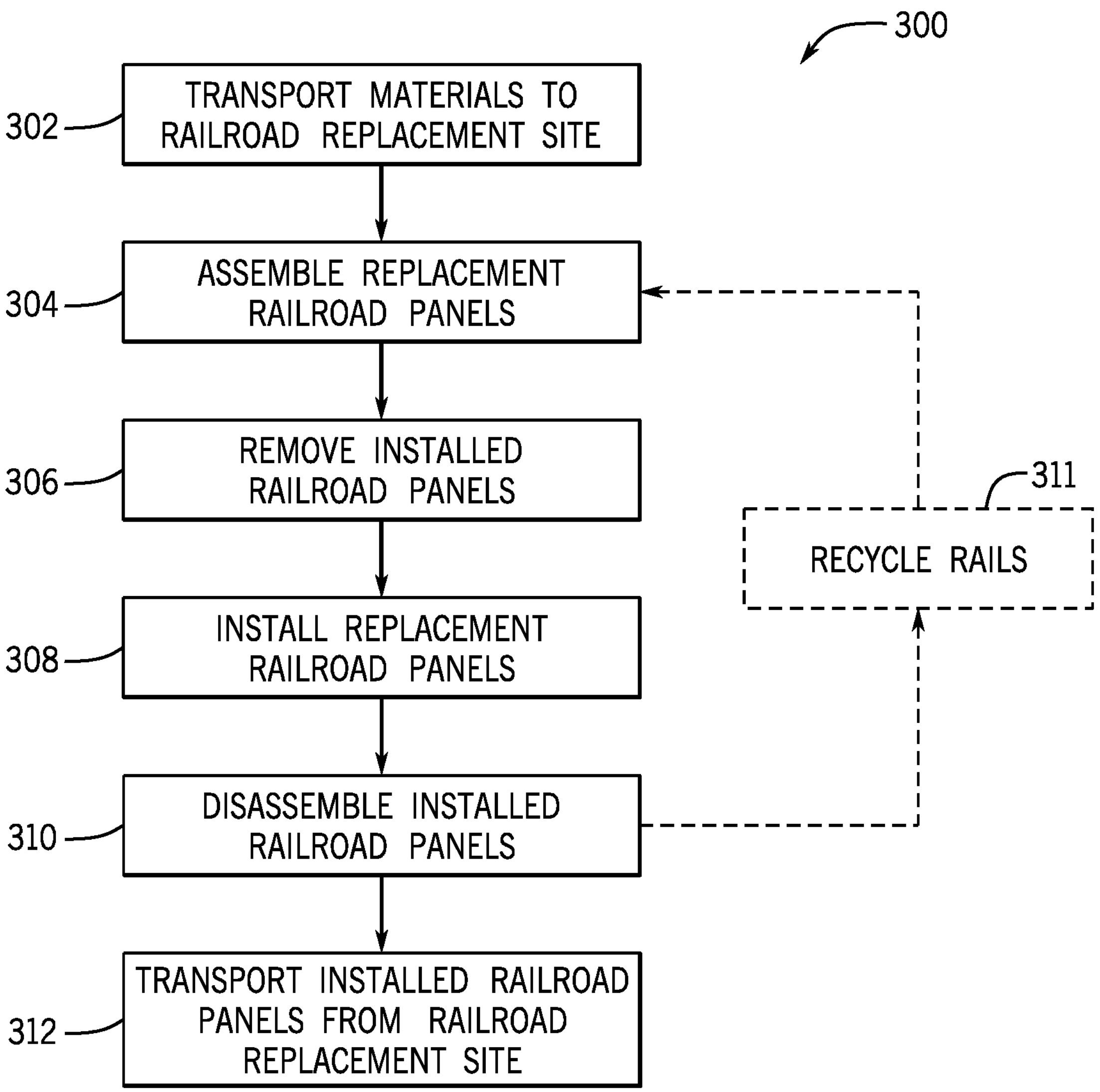
FIG. 9 is a process diagram of a railroad panel replacement process that can be performed using the mobile crane assembly of FIG. 4.

With continued reference to FIGS. 1-8 and further reference to FIG. 9, a process 300 for replacing a bridge panel (e.g., bridge 202 shown in FIG. 4) or railroad track panel is provided. The process 300 can be performed using the mobile crane assembly 200 described herein, and is described with reference to the specific components present within the mobile crane assembly 200. Using the process 300 for replacing a bridge panel or railroad track panel, railroad segments can be replaced faster, safer, and more efficiently than conventional methods.

At block 302, materials are transported to the railroad replacement site. Materials transported to the railroad replacement site may include railroad ties 176, rails 178, 180, railroad panels, concrete or metal structural members, ballast, fasteners, tools, or other items that may be useful in assembling or disassembling sections of a railroad 116. The various materials transported to the railroad replacement site can be transported on one of several flat carts 134 or mule carts 144 present within the mobile crane assembly 200.

Next, replacement railroad panels can be assembled at block 304. With additional reference to FIGS. 10A and 10B, the railroad panel assembly process is demonstrated. As discussed previously, railroad ties 176 and rails 178, 180 can be transported to the railroad replacement site. In some aspects, the railroad ties 176 and rails 178, 180 can then be moved toward the mobile crane 100 using mule carts 144. Because of their width, replacement railroad ties 176 may be advantageously shipped in large stacks and oriented in a direction approximately parallel to the rails 118, 120 of the railroad 116 underneath the mobile crane assembly 200.

Figure 10A:
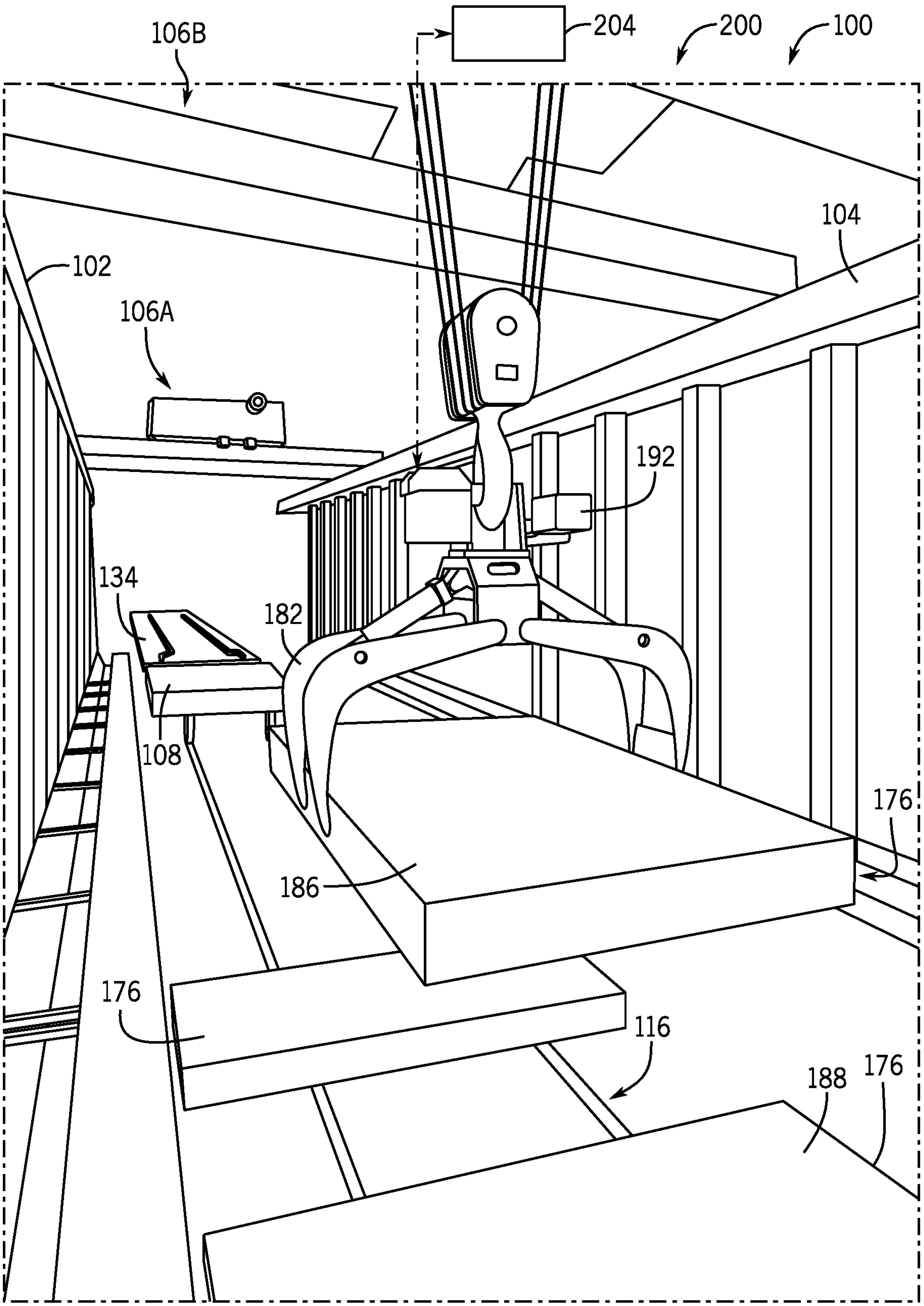
FIG. 10A is a pictorial view of a step in a railroad panel replacement process in FIG. 9 that can be performed using the mobile crane assembly of FIG. 4.
Figure 10B:
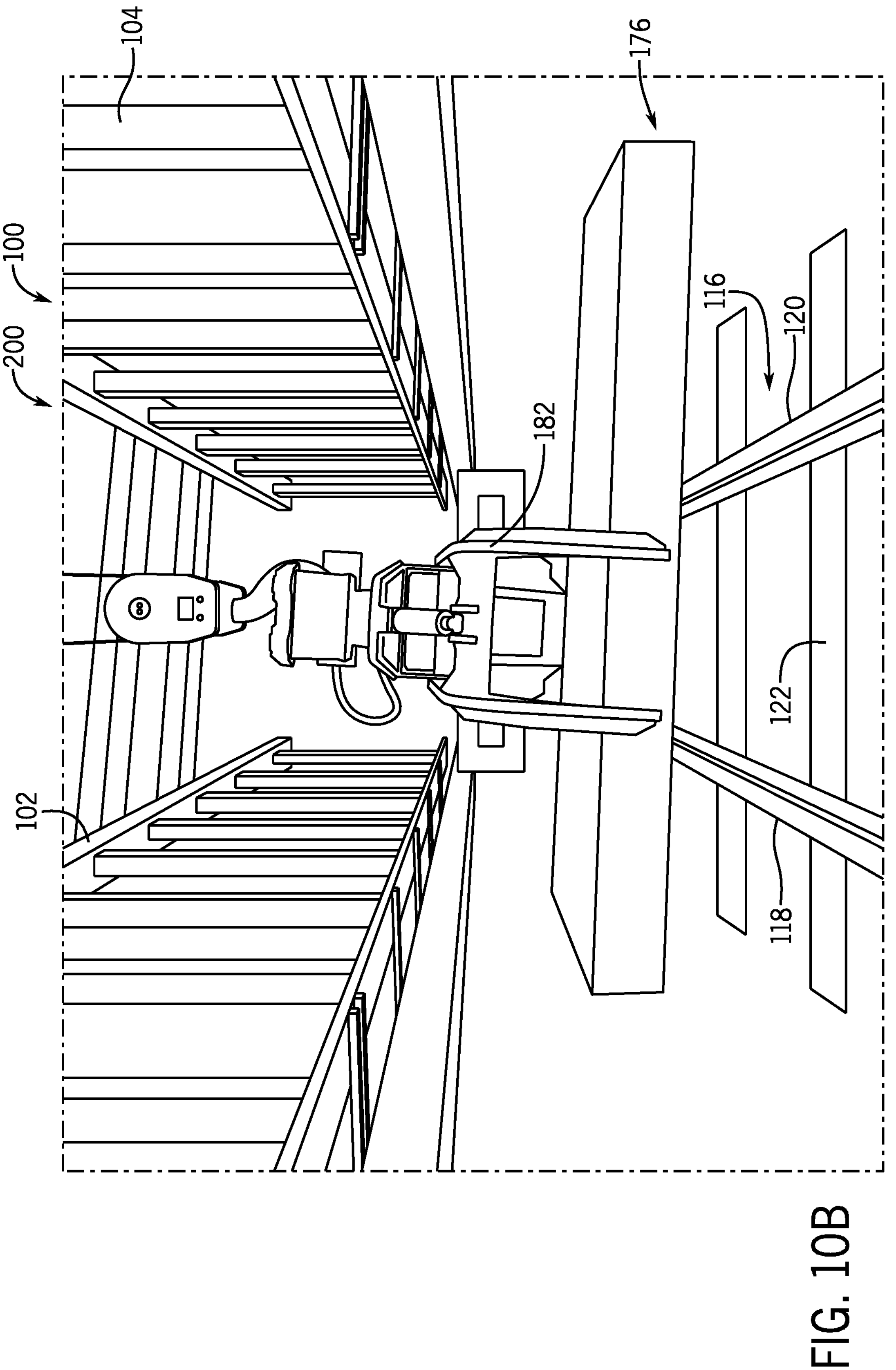
FIG. 10B is a pictorial view of an additional step in the railroad panel replacement process of FIG. 9 being performed over existing railroad tracks.

Using a grapple 182 coupled to an upper gantry assembly 106A, 106B, 106C, one or more railroad ties 176 can be picked from a mule cart 144 positioned upon one of the rail car end assemblies 108, 110. The grapple 182 can be rotated to align the railroad ties 176 perpendicular to the rails 118, 120 of the track 116 as shown in FIG. 10B, and can set the railroad ties 176 upon the existing track 116 to begin assembling replacement railroad panels 184, as shown in FIG. 11.

Using the grapple 182 or a different tool suspended by an overhead gantry assembly 106A, 106B, 106C, rails 178, 180 can be placed over the replacement railroad ties 176. In some aspects, the rails 178, 180 can be unloaded from a mule cart 144 on the second rail car end assembly 110 (e.g., using overhead gantry assembly 106C and/or 106B) while the railroad ties 176 are unloaded from a mule cart 144 on the first rail car end assembly 108 (e.g., using overhead gantry assembly 106A). Once the rails 178, 180 are properly aligned upon the replacement railroad ties 176, the railroad ties 176 and rails 178, 180 can be coupled to one another to produce a replacement railroad panel 184. In some non-limiting examples, metal fasteners 186 (e.g., railroad spikes) and tie plates 188 are used to securely couple the rails 178, 180 to the railroad ties 176. In some aspects, reinforcing bars 190 are coupled to the railroad ties 176 and can be used to maintain proper alignment between the ties 176 and the rails 178, 180. The reinforcing bars 190 can be wooden members (e.g., a 2×4) fastened to each railroad tie 176 in the panel 184, for example.

Figure 11:
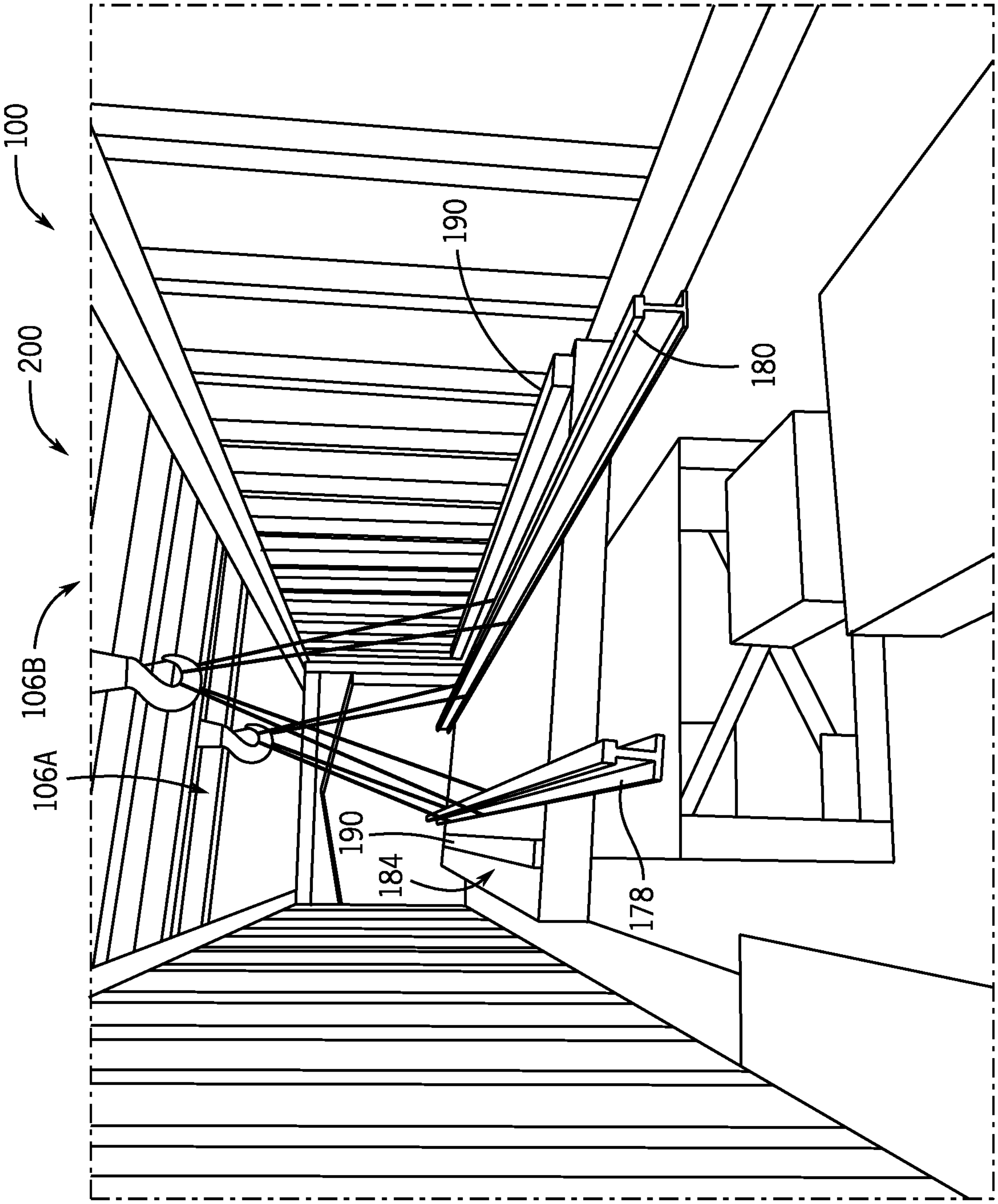
FIG. 11 is a pictorial view of an assembled panel being removed from an area within the mobile crane of FIG. 2.

Once the railroad panel 184 is fully assembled, it can be removed from the mobile crane 100 using one or more of the upper gantry assemblies 106A, 106B, 106C as shown in FIG. 11. The assembled replacement railroad panel 184 can be transferred onto a mule cart 144 positioned on one of the rail car end assemblies 108, 110, where it can then be moved away from the mobile crane 100 for storage until use. By using the mobile crane 100 to build panels 184, the panels 184 do not need to be shipped over long distances and subjected to vibrational stresses and impacts that can cause fatigue before the panels are even installed. Using the mobile crane assembly 200 to perform on-site and mobile railroad replacement panel assembling, panels 184 can be built out of higher quality materials and can have an increased lifetime.

The grapple 182 and other tools (e.g., a rail saw, an impact wrench, welding tools, etc.) can be suspended from the upper gantry assemblies 106A, 106B, 106C in a completely or partially untethered manner. As shown in FIG. 10A, the grapple 182 can include its own on-board hydraulic system 192 that may operate completely independent of a power source (e.g., a 480 V 3 Phase generator) used to power the motors and other components of the mobile crane 100. Self-contained and untethered tools like the grapple 182 lessen the need for long hoses and other power transmission equipment (e.g., wires) that may extend downward from the upper gantry assemblies 106A, 106B, 106C that could get in the way of workers as they perform various railroad maintenance and building tasks. The untethered tools in combination with the upper gantry assemblies 106A, 106B, 106C can position railroad ties, rails, panels, and tools vertically, transversely, and longitudinally, and can enable a precision panel assembling process 304. In some aspects, the grapple 182 or other tools can be placed in electrical communication with the controller 204, and can be operated electronically (using an on-board battery, for example) and remotely.

Figure 12A:
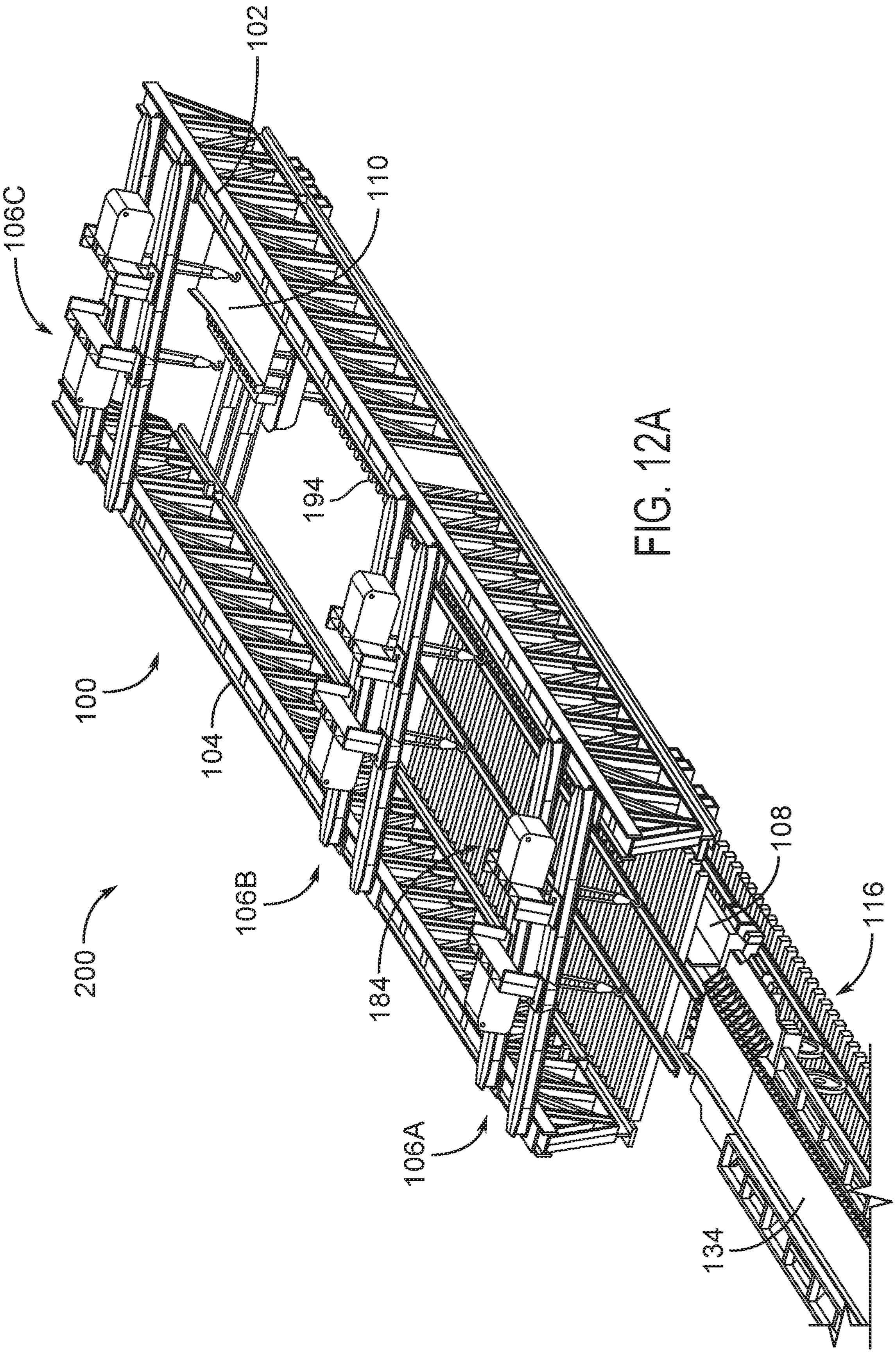
FIG. 12A is a top perspective view of a step of the railroad panel replacement process of FIG. 9.
Figure 12B:
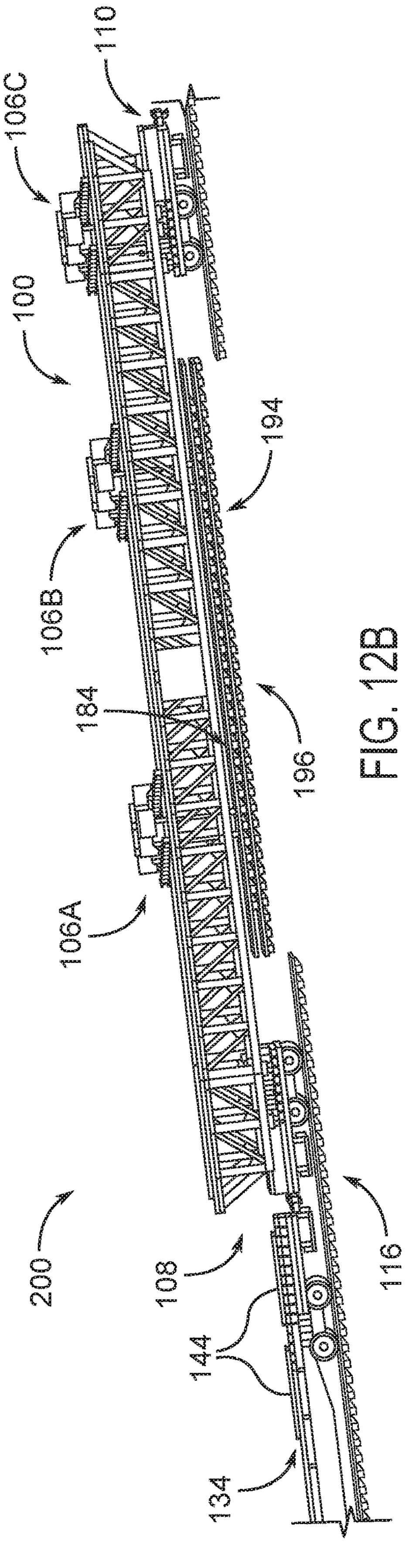
FIG. 12B is a perspective view of an additional step of the railroad panel replacement process of FIG. 9.
Figure 12C:
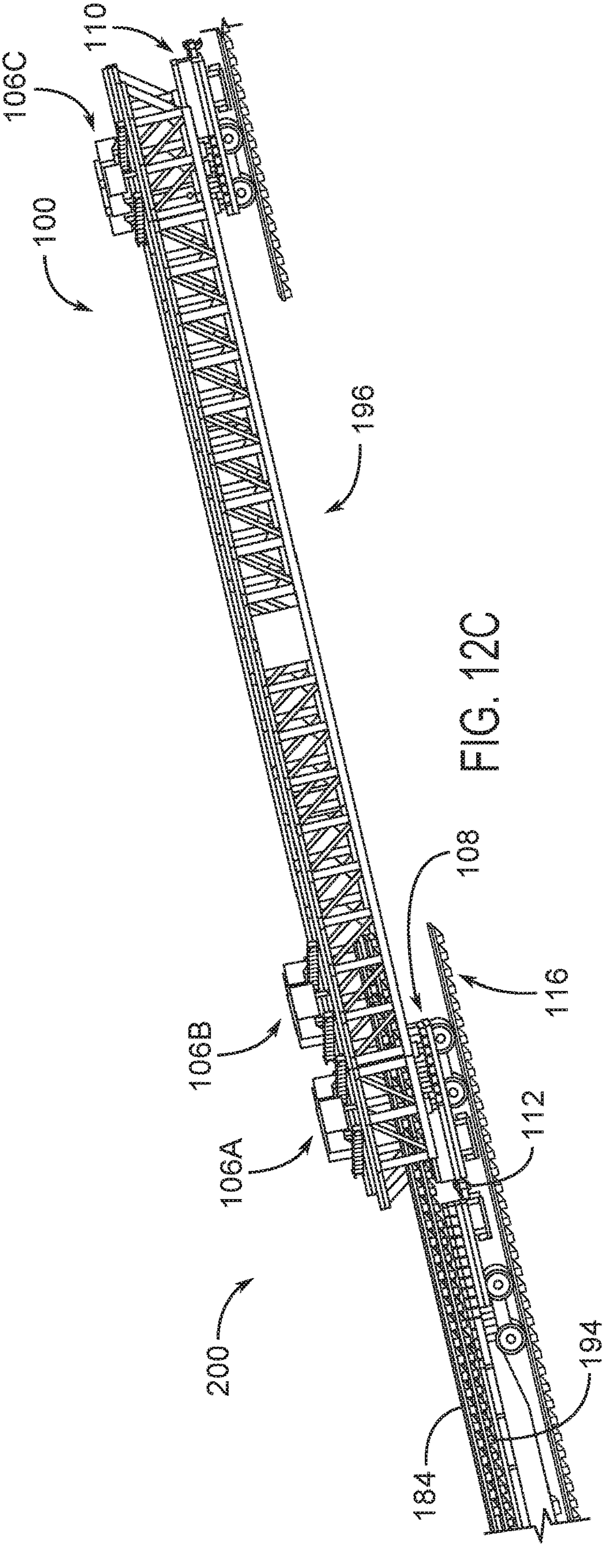
FIG. 12C is a perspective view of an additional step of the railroad panel replacement process of FIG. 9.

With further reference to FIGS. 12A-12C, the steps of removing an installed railroad panel 194 at block 306 and installing a replacement railroad panel 184 at block 308 are shown. The mobile crane assembly 200 is transported along the railroad track 116 until the mobile crane 100 is positioned above the installed railroad panel 194 that needs to be replaced. The mobile crane 100 can be transitioned from a transport configuration to a work configuration, and the jacks 132, 146 can engage the rails 118, 120 to elevate and secure the mobile crane 100 upon the railroad track 116. An assembled replacement railroad panel 184 can then be transported toward the mobile crane 100 using mule carts 144 and flat carts 134. The assembled replacement railroad panel 184 can transported onto a rail car end assembly 108, 110, where it can be lifted using the hoists (along with additional lifting chains, straps, etc., if needed) of one or more upper gantry assemblies 106A, 106B, 106C, as shown in FIG. 12A.

Using the upper gantry assemblies 106A, 106B, 106C, the assembled replacement railroad panel 184 can be positioned upon the installed railroad panel 194 to be replaced. The hoists and other lifting tools can be removed from the assembled replacement railroad panel 184 and can be coupled to both the installed railroad panel 194 and the assembled replacement railroad panel 184. The upper gantry assemblies 106A, 106B, 106C can then lift both the installed railroad panel 194 and the assembled replacement railroad panel 184 simultaneously to remove both panels 184, 194 from the railroad track 116, as shown in FIG. 12B. The upper gantry assemblies 106A, 106B, 106C can translate along the longitudinal axis X-X of the mobile crane 100 toward a rail car end assembly 108, 110, which can have a mule cart 144 positioned upon its upper surface 124. Both panels 184, 194 can be set upon the mule cart 144, and can be uncoupled from the upper gantry assemblies 106A, 106B, 106C, as shown in FIG. 12C.

Figure 13A:
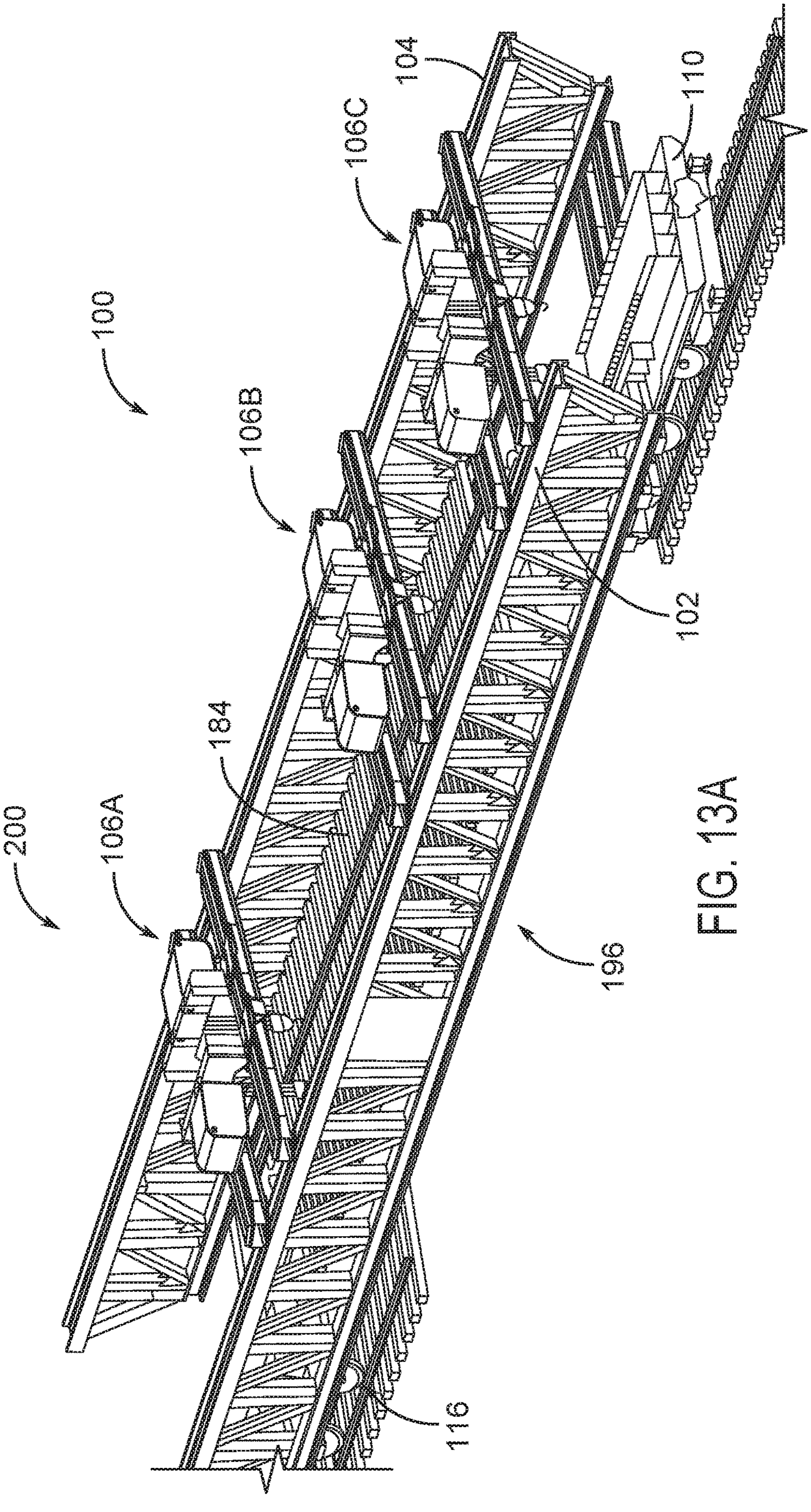
FIG. 13A is a perspective view of an additional step of the railroad panel replacement process of FIG. 9.
Figure 13B:
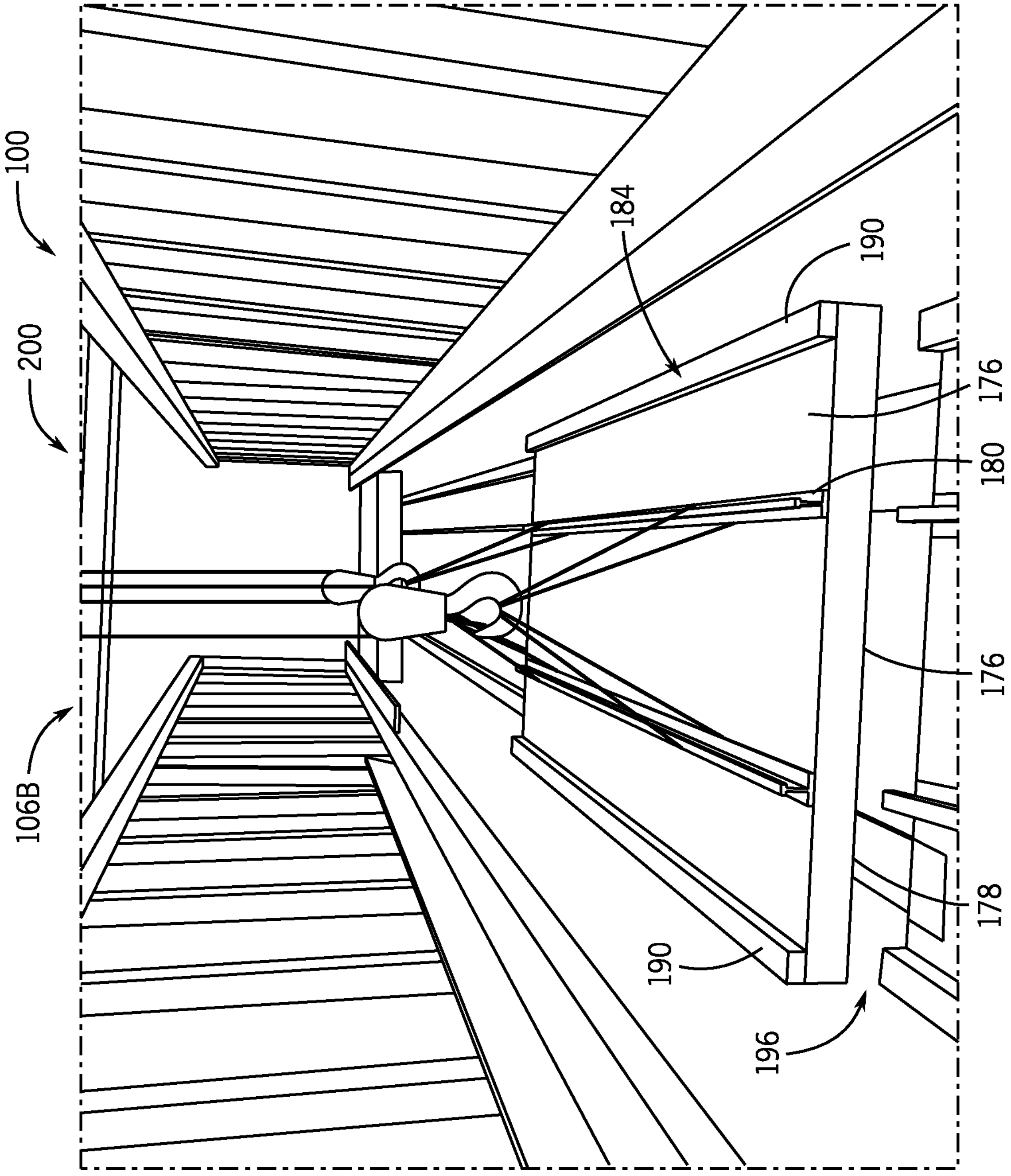
FIG. 13B is a pictorial view of the step of FIG. 13A being performed.

Because the assembled replacement railroad panel 184 is stacked on top of the railroad panel 194, the hoists of the upper gantry assemblies 106A, 106B, 106C can lift the replacement railroad panel 184 independently of the previously installed railroad panel 194. The upper gantry assemblies 106A, 106B, 106C can remove the replacement railroad panel 184 from the rail car end assembly 108, 110 and can position the panel 184 over a gap 196 created in the railroad 116 when the installed railroad panel 194 was removed, as shown in FIGS. 13A and 13B. The assembled replacement railroad panel 184 can then be lowered into position in the gap 196 and coupled to the railroad 116.

After the assembled replacement railroad panel 184 is removed from the previously installed railroad panel 194, the previously installed railroad panel 194 can be moved away from the mobile crane 100 using one or more mule carts 144, where it can be stored until it is disassembled at block 310. Using the upper gantry assemblies 106A, 106B, 106C, the panel 194 can be removed from a mule cart 144 on a rail car end assembly 108, 110 and positioned within the mobile crane 100. An impact wrench (not shown) or other tools coupled to one or more upper gantry assemblies 106A, 106B, 106C can be used to remove the rails 118, 120 from the railroad ties 122. A grapple 182 can be used to pick and move the rails 118, 120 and railroad ties 122 onto nearby mule carts 144, which can transport the rails 118, 120 and railroad ties 122 away from the mobile crane 100, where they can be disposed of. In some aspects, the process 300 further includes recycling the rails 118, 120 of the panel 194, which can be used to build another panel with the mobile crane 100 at block 304. In these non-limiting examples, the rails 118, 120 may be set aside within the mobile crane 100 while a new set of replacement railroad ties 176 is picked off of a mule cart 144 and positioned upon the railroad 116 below. This additional step 311 of recycling can increase the efficiency of the process 300 by reducing the total material, time, and labor costs associated with the process 300.

Finally, at block 312, the panels 194 can be transported away from the railroad replacement site. The panels 194 can be transported away from the railroad replacement site using mule carts 144 traveling along flat carts 134. Finally, the panels 194 can be transported further away from the railroad replacement site when the mobile crane 100 is transitioned back into a transport configuration and one or more locomotives (not shown) transports the entire mobile crane assembly 200 away from the railroad replacement site.

Using the disclosed systems and methods for replacing a railroad track or bridge, the time and labor necessary to complete rail maintenance is significantly reduced. The mobile crane assembly 200 can quickly and easily transfer building materials and tooling toward and away from the mobile crane 100 using mule carts 144 traveling along flat carts 134, and can be used to build, load, ship, exchange, return, unload, disassemble, re-use, and dispose of railroad panels, railroad ties, and railroad tracks safely and efficiently.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

We claim:

1. A mobile crane assembly comprising:

a mobile crane having a longitudinal axis and a first truss assembly and a second truss assembly spaced apart and extending approximately parallel to the longitudinal axis, the first truss assembly and the second truss assembly movable transversely to the longitudinal axis to translate between a transport configuration and a work configuration, the mobile crane having at least one upper gantry assembly spanning the first truss assembly and the second truss assembly and slidably movable parallel to the longitudinal axis; and a mule cart pathway extending away from the mobile crane and being partially defined by at least one flat cart coupled to a rail car end assembly, the rail car end assembly being slidably coupled to the mobile crane and configured to move the first truss assembly and second truss assembly transverse to the longitudinal axis, wherein the mule cart pathway is defined by guide rails coupled to an upper surface of the at least one flat cart and extending along a longitudinal axis of the flat cart, the guide rails including a tapered section and a straight section.

2. The mobile crane assembly of claim 1, wherein a second mule cart pathway extends away from an opposite end of the mobile crane and is defined by at least one flat cart coupled to a second rail car end assembly, the second rail car end assembly being slidably coupled to the mobile crane and configured to move the first truss assembly and second truss assembly transverse to the longitudinal axis.

3. The mobile crane assembly of claim 1, wherein two tapered sections are present within each guide rail, and each of the two tapered sections extends inwardly from opposing ends of the flat cart.

4. The mobile crane assembly of claim 1, wherein an extension member is hingedly coupled to the upper surface of the flat cart, the extension member extending outwardly from the upper surface of the flat cart toward a cart coupling.

5. The mobile crane assembly of claim 1, wherein the at least one flat cart comprises four hydraulic jacks.

6. The mobile crane assembly of claim 5, wherein the hydraulic jacks each comprise a brace having a U-shaped profile.

7. The mobile crane assembly of claim 1, further comprising at least one mule cart configured to travel about the mule cart pathway.

8. The mobile crane assembly of claim 7, wherein the at least one mule cart is in electrical communication with a controller, the controller being in further electrical communication with at least one motor coupled to the upper gantry assembly.

9. The mobile crane assembly of claim 8, wherein a motor coupled to the rail car end assembly is in electrical communication with the controller.

10. The mobile crane assembly of claim 1, wherein a plurality of illumination sources are coupled to at least one of the first truss assembly and the second truss assembly.

11. A mobile crane assembly comprising:

a mobile crane having a first truss assembly and a second truss assembly spaced apart and movable relative to one another, the first truss assembly and the second truss assembly each coupled to a rail car end assembly, the mobile crane further comprising an upper gantry assembly movable along the first truss assembly and the second truss assembly;

a flat cart coupled to the rail car end assembly;

a material handling cart received upon the flat cart and configured to move between the flat cart and the rail car end assembly; and a controller in communication with the upper gantry assembly and the material handling cart, wherein the controller is configured to control the movement of the upper gantry assembly and the material handling cart.

12. The mobile crane assembly of claim 11, further comprising a mule cart pathway extending away from the mobile crane and being partially defined by at least one flat cart coupled to the rail car end assembly, the rail car end assembly being slidably coupled to the mobile crane and configured to move the first truss assembly and second truss assembly transverse to a longitudinal axis defined thereby.

13. The mobile crane assembly of claim 12, wherein a second mule cart pathway extends away from an opposite end of the mobile crane and is defined by at least one flat cart coupled to a second rail car end assembly, the second rail car end assembly being slidably coupled to the mobile crane and configured to move the first truss assembly and second truss assembly transverse to the longitudinal axis.

14. The mobile crane assembly of claim 12, wherein the mule cart pathway is defined by guide rails coupled to an upper surface of the flat cart and extending along a longitudinal axis of the flat cart, the guide rails including a tapered section and a straight section.

15. The mobile crane assembly of claim 14, wherein two tapered sections are present within each guide rail, and each of the two tapered sections extends inwardly from opposing ends of the flat cart.

16. The mobile crane assembly of claim 14, wherein an extension member is hingedly coupled to the upper surface of the flat cart, the extension member extending outwardly from the upper surface of the flat cart toward a cart coupling.

17. The mobile crane assembly of claim 12, wherein the at least one flat cart comprises four hydraulic jacks.

18. The mobile crane assembly of claim 17, wherein the hydraulic jacks each comprise a brace having a U-shaped profile.

19. The mobile crane assembly of claim 11, wherein the controller is in communication with a motor coupled to the material handling cart.

20. The mobile crane assembly of claim 11, wherein a plurality of illumination sources are coupled to at least one of the first truss assembly and the second truss assembly.

* * * * *